W. ZANIEWSKI.
ELECTRIC RAT TRAP.
APPLICATION FILED DEC. 9, 1911.
1,023,608.
Patented Apr. 16, 1912.
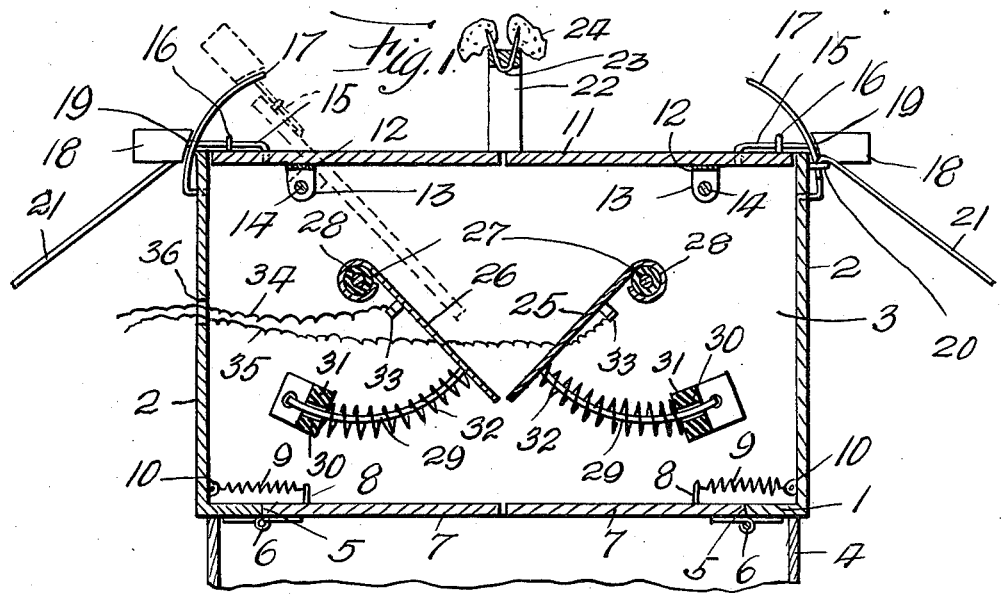
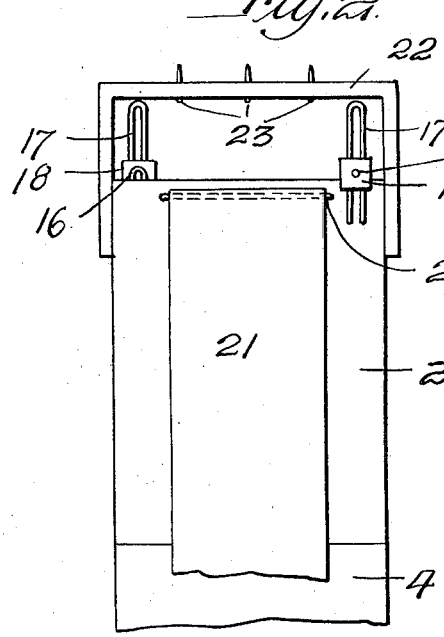
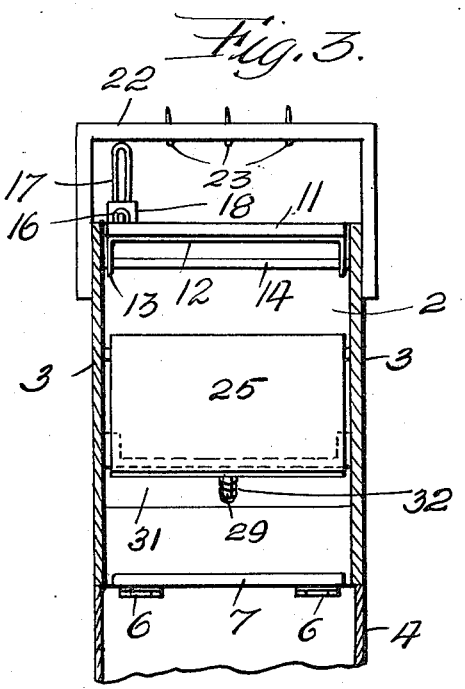
WITNESSES
Samuel Payne
Ralph C. Evert
INVENTOR
W. Zaniewski.
BY
ATTORNEYS

UNITED STATES PATENT OFFICE.

WILLIAM ZANIEWSKI, OF BOSTON, MASSACHUSETTS.

ELECTRIC RAT-TRAP.

1,023,608.  Specification of Letters Patent.  Patented Apr. 16, 1912.

Application filed December 9, 1911. Serial No. 664,698.

*To all whom it may concern:*

Be it known that I, WILLIAM ZANIEWSKI, a subject of the Emperor of Austria-Hungary, residing at Boston, in the county of Suffolk and State of Massachusetts, have invented certain new and useful Improvements in Electric Rat-Traps, of which the following is a specification, reference being had therein to the accompanying drawing.

This invention relates to electric rat traps, and the primary object of my invention is to provide a trap that can be used in connection with a suitable receptacle and a suitable source of electrical energy for entrapping and electrocuting rats and other rodents.

A further object of this invention is to provide an electric rat trap that is simple in construction, safe to use and highly efficient for exterminating rats in large buildings, wharves, and structures infested with rodents.

These and such other objects as may hereinafter appear are attained by a mechanical construction that will be hereinafter specifically described and then claimed.

Reference will now be had to the drawing, wherein:—

Figure 1 is a longitudinal sectional view of a trap in accordance with this invention. Fig. 2 is an end view of the same, and Fig. 3 is a cross sectional view of the trap.

A trap in accordance with this invention comprises a box having a bottom plate 1, end walls 2 and side walls 3. The box is located upon the upper edges of a tank or receptacle 4 containing water or other liquid, as a disinfectant or deodorant.

The bottom plate 1 of the box has a rectangular opening 5 and hinged or otherwise connected, as at 6 to the under side of the bottom plate 1 are normally closed trap doors 7. The upper sides of the doors are provided with staples 8 connected by coiled springs 9 to eyes 10, carried by the inner sides of the end walls 2. The tension of the springs 9 is sufficient to retain the trap doors in a horizontal position, closing the upper end of the tank or receptacle 4, said trap doors opening by the weight of a rodent's body.

Arranged in the upper open end of the box are tiltable top plates 11 supported by straps 12 having apertured ears 13 pivotally mounted upon transverse rods 14, carried by the side walls 3 of the box. The outer ends of the tiltable top plates 11 are provided with lateral arms 15 having the ends thereof mounted in said top plates, said arms being further held by staples 16. The arms 15 extend through curved guide yokes 17, carried by the outer side of the end walls 2. Mounted upon the outer ends of the arms 15 are weights 18 having the inner ends thereof cut away to provide clearance for the guide yokes 17. The guide yokes are employed to limit the opening movement of the top plates 11. The weights 18 retain the tiltable top plates 11 in a normally closed and horizontal position, but allowing the top plates to tilt by the weight of a rodent's body. The weighted arms I carry at opposite sides of the tiltable top plates, as best shown in Fig. 2.

The outer sides of the end walls 2 are provided with staples 20 and connected to said staples are the upper hook-shaped ends of gang planks 21, these gang planks facilitating a rodent in reaching the top of the box. To attract a rodent to the top of the box, the side walls 3 support a bait holder 22 centrally of the box, said bait holder having prongs or inverted staples 23 upon which a bait 24 can be mounted.

Arranged within the box between the side walls 3 are tiltable contact plates 25 and 26. These plates are mounted upon bushings 27 of insulation carried by transverse rods 28 pivotally mounted in the side walls 3. The underneath sides of said contact plates are provided with curved rods 29 extending through openings 30 provided therefor in transverse guide bars 31 secured to the inner sides of the walls 3. The guide bars 31 are made of an insulation material, and encircling the rods 29, between the plates 25 and 26 and the bars 31 are coiled springs 32 holding the contact plates 25 and 26 normally closed with the free edges thereof in proximity to each other, said contact plates presenting a transverse V-shaped trough centrally of the box. The rods 29 are provided with heads which are adapted to engage the guide bars 31, thereby arresting the movement of the contact plates 25 and 26 against the action of the springs 32, so that the contact plates will not come into engagement with each other.

The underneath sides of the contact plates 25 and 26 are provided with binding posts 33 and connected to these posts are wires 34 and 35 that extend through an opening 36 in one of the end walls 2. The wires 34 and 35 are connected to a suitable source of electrical energy, as a generator or batteries provided with induction coils capable of producing 800 or more volts.

A rodent attempting to obtain the bait 24 must tread upon the tiltable top plates 11. The top plates give way under the weight of a rodent's body, and the rodent is deposited in the trough formed by the contact plates 25 and 26. When the body of a rodent contacts with these plates the normally open circuit is closed, thereby shocking or electrocuting the rodent. The contact plates open under the weight of the rodent's body and the rodent is precipitated onto the trap doors, which open and deposit the rodent in the tank or receptacle 4. The doors 7, contact plates 25 and 26, and the tiltable top plates 11 assume their normal position when released of the weight of the rodent.

What I claim is:—

In an electric rat trap, the combination with a suitable source of electrical energy, of a tank, a box located upon said tank and in communication therewith, tiltable top plates forming the top of said box, tiltable contact plates arranged in said box and in a normally open circuit with said source of electrical energy, guide bars arranged in said box, headed curved rods carried by said plates and extending into said bars, coiled springs encircling said rods between said bars and said contact plates, said headed rods capable of engaging said bars and constituting stops to arrest the movement of said contact plates to prevent the engagement thereof with each other, and means adapted to retain said tiltable top plates normally closed.

In testimony whereof I affix my signature in the presence of two witnesses.

WILLIAM ZANIEWSKI.

Witnesses:
WILLIAM ZACHKASKY,
STEFAN PLEHOWICZ.